United States Patent [19]
Matsuzaki

[11] Patent Number: 5,139,342
[45] Date of Patent: Aug. 18, 1992

[54] PHOTOGRAPHIC LENS SYSTEM

[75] Inventor: Hiroshi Matsuzaki, Tokyo, Japan

[73] Assignee: Olympus Optical Co., Ltd., Tokyo, Japan

[21] Appl. No.: 642,437

[22] Filed: Jan. 17, 1991

[30] Foreign Application Priority Data

Jan. 18, 1990 [JP] Japan .................. 007231/90

[51] Int. Cl.$^5$ ............................... G02B 9/36
[52] U.S. Cl. ........................... 359/708; 359/775
[58] Field of Search ......... 350/470, 432, 480, 479; 359/708, 775, 793, 794

[56] References Cited

U.S. PATENT DOCUMENTS

| | | | |
|---|---|---|---|
| 4,171,872 | 10/1979 | Baker | 350/212 |
| 4,359,271 | 11/1982 | Mihara | 350/432 |
| 4,457,592 | 7/1984 | Baker | 350/432 |
| 4,561,730 | 12/1985 | Lawson et al. | 350/432 |

FOREIGN PATENT DOCUMENTS

| | | |
|---|---|---|
| 51-8932 | 1/1976 | Japan . |
| 61-277914 | 12/1986 | Japan . |
| 61-292119 | 12/1986 | Japan . |

*Primary Examiner*—Frank Gonzalez
*Attorney, Agent, or Firm*—Cushman, Darby & Cushman

[57] ABSTRACT

A photographic lens system comprising, in the order from the object side, a first lens component which is designed as a cemented doublet consisting of a positive lens element and a negative lens element in this order, a second lens component which is designed as a cemented doublet consisting of a negative lens element and a positive lens element in this order, and an aperture stop arranged between said first lens component and said second lens component, and using at least the aspherical surface therein. This photographic lens system comprises a small number of lens elements, and has a high aperture ratio and favorably corrected aberrations.

9 Claims, 6 Drawing Sheets

PHOTOGRAPHIC LENS SYSTEM

BACKGROUND OF THE INVENTION a) Field of the Invention

The present invention relates to a lens system for use with photographic cameras.

b) Description of the Prior Art

The standard lens systems currently used for single-lens reflex cameras are generally designed as the so-called Gauss type which is composed of about six lens elements arranged nearly symmetrically with regard to an aperture stop. Due to this arrangement of the lens element nearly symmetrical with regard to the aperture stop, the Gauss type lens system requires a relatively large number of lens elements and a high manufacturing cost though the offaxial aberrations are corrected favorably therein.

As lens systems consisting of small numbers of lens elements, there are known the triplet type and Tessar type lens systems. However, it is difficult to design these types of lens systems so as to have high aperture ratios and aberrations corrected sufficiently favorably.

Further, there are known lens systems each of which is composed of four lens elements arranged completely symmetrically with regard to an aperture stop, as exemplified by the lens system disclosed by Japanese Patent Kokai Publication No. 51-8932. However, this lens system has a low aperture ratio of F/8 and is not practical for use as a standard lens system for general photographic cameras.

Moreover, a symmetric type lens system which consists of four lens elements including aspherical lens elements is illustrated in FIG. 57, on page 31, of the Camera Review magazine.

This lens system also has a low aperture ratio of F/6.3 and is not suited for use as a standard lens system for photographic cameras. In addition, this literature clarifies no numerical data for the lens system and constitutes no reference for lens design.

As is understood from the foregoing description, each of the conventional Gauss type lens systems used as the standard lens system for photographic cameras comprises lens elements in the large number of about six, or when the lens system is composed of lens elements in a small number of about four, it has a low aperture ratio and aberrations insufficiently corrected.

SUMMARY OF THE INVENTION

A primary object of the present invention is to provide a photographic lens system which comprises a small number of lens elements, and has a high aperture ratio and favorably corrected aberrations.

The photographic lens system according to the present invention comprises, in the order from the object side, a first lens component which is designed as a cemented doublet consisting of a positive lens element and a negative lens element arranged in this order, a second lens component which is designed as a cemented doublet consisting of a negative lens element and a positive lens element arranged in this order, and an aperture stop arranged between said first lens component and said second lens component, and uses at least one aspherical surface arranged therein.

The photographic lens system according to the present invention has aberrations which are favorably corrected by using the two cemented doublets each of which consists of a positive lens element and a negative lens element, adopting at least one aspherical surface, and arranging the lens element nearly symmetrically with regard to the aperture stop, concretely in the order of the positive lens element, the negative lens element, the aperture stop, the negative lens element and the positive lens element.

The photographic lens system according to the present invention is designed so as to suppress production of aberrations of high orders by cementing the positive lens elements and the negative lens elements to each other, and prevent optical performance thereof from being degraded due to eccentricity of the lens elements at the stage of assembly.

The triplet type or the Tessar type lens system which is composed of three or four lens elements can have an aperture ratio on the order of F/2.8. This is because spherical aberration can be corrected sufficiently by the front and rear surfaces of the second lens element in this type lens system wherein the first lens element and the second lens element are separated from each other.

In the photographic lens system according to the present invention, aberrations of high orders can hardly be produced owing to the use of the cemented doublets, but spherical aberration is undercorrected due to the reduced number of the lens surfaces having the function to correct the spherical aberration.

In the Gauss type lens system which comprises the lens elements in the number of about six or the lens surfaces of a large number, aberrations can be corrected sufficiently with spherical surfaces only, whereas aberrations cannot be corrected favorably with spherical surfaces only in the lens system comprising the four lens elements.

The present invention uses at least one aspherical surface for correcting spherical aberration in the photographic lens system. As compared with a spherical lens element, an aspherical lens element can diversify refracting directions for rays and correct spherical aberration favorably. In order to obtain a high aperture ratio of the lens system, it is necessary to enlarge diameters of the lens system, but it will be difficult to correct aberrations of rays having large heights with the four lens elements when the lens system has a large diameter. In the photographic lens system according to the present invention, at least one aspherical surface having refractive power which is lowered as the surface portions are farther from the optical axis is used for correcting the spherical aberration of the rays having large heights which cannot be corrected with spherical surfaces only.

When the intersection between the optical axis and the lens surface is taken as the origin, the direction of the optical axis is taken as the x axis and the direction perpendicular to the optical axis is taken as the y axis, the shape of the aspherical surface or surfaces to be used in the photographic lens system according to the present invention is expressed by the following formula:

$$x = \frac{y^2/r}{1 + \sqrt{1 - p(y/r)^2}} + \sum_{i=2}^{n} A_{2i} y^{2i}$$

wherein the reference symbol r represents the radius of curvature on the reference sphere of the aspherical surface, the reference symbol p designates the conical constant and the reference symbol $A_{2i}$ denotes the aspherical surface coefficients.

It is desirable to design the aspherical surface or surfaces to be used in the photographic lens system according to the present invention so as to satisfy the following condition (1):

$$0.003 < \Sigma |\Delta x_i| \cdot F/h < 0.1 \quad (y = y_{mi}) \tag{1}$$

wherein the reference symbol $\Delta x_i$ represents the departure of the aspherical surface used as the i'th surface from the reference sphere thereof, the reference symbol $y_{mi}$ designates the height of the marginal ray on the i'th surface and the reference symbol h denotes the maximum image height. Further, the reference symbol $\Sigma$ means, when a plurality of aspherical surfaces are used, totalizing values of departure thereof.

If the lower limit of the condition (1) is exceeded, the departure will be too small for correcting the spherical aberration sufficiently. If the upper limit of the condition (1) is exceeded, in contrast, the spherical aberration will be overcorrected, thereby undesirably degrading balance among aberrations.

It is desirable to design the photographic lens system according to the present invention so as to satisfy the following condition (2):

$$r_1 > r_3, \quad r_7 > r_5 \tag{2}$$

wherein the reference symbols $r_1$ and $r_2$ represent the radii of curvature on the object side surface and the image side surface respectively of the first lens component, and the reference symbols $r_5$ and $r_7$ designate the radii of curvature on the object side surface and the image side surface respectively of the second lens component.

In the photographic lens system according to the present invention, the marginal ray is the lowest on the surfaces adjacent to the aperture stop and enhanced on the surfaces farther from the aperture stop. A lens surface which has a small radius of curvature is apt to produce the spherical aberration in a larger amount for a marginal ray having a larger height. If the condition (2) is not satisfied, the spherical aberration will therefore be aggravated and can hardly be corrected.

In the photographic lens system according to the present invention wherein the lens elements are arranged nearly symmetrically with regard to the aperture stop, distortion, lateral chromatic aberration and coma are corrected favorably. When a lens system has a composition wherein lens elements are arranged symmetrically with regard to an aperture stop, rays travel symmetrically with regard to the aperture stop, or the rays incident on the aperture stop are symmetrical with the rays emerging from the aperture stop on both the sides of the aperture stop, whereby distortion, lateral chromatic aberration and coma before and after the aperture stop are cancelled with each other. In order that the aberrations before and after the aperture stop are cancelled with each other or corrected favorably in the photographic lens system as a whole, it is desirable to design the lens system so as to satisfy the condition (3) defined below:

$$-2.5 < r_1/r_7 < -0.4$$

$$-2.5 < r_3/r_5 < -0.4 \tag{3}$$

If the condition (3) is not satisfied, the lens system will lose the symmetry in arrangement of the lens elements, thereby making it difficult to correct the distortion and lateral chromatic aberration.

As is generally known well, it is effective for correcting chromatic aberration to use a combination a positive lens element having a large Abbe's number and a negative lens element having a small Abbe's number.

In order to correct chromatic aberration in the photographic lens system according to the present invention, it is desirable to design each of the negative lens elements so as to have an Abbe's number satisfying the following condition (4):

$$\nu_n < 50 \tag{4}$$

wherein the reference symbol $\nu_n$ represents the Abbe's number of the negative lens element.

If the condition (4) is not satisfied, it will be difficult to correct the chromatic aberration in the photographic lens system according to the present invention.

Further, in order to correct Petzval's sum of a lens system, it is effective to use a combination of a positive lens element having a high refractive index and a negative lens element having a low refractive index.

In order to correct Petzval's sum of the photographic lens system according to the present invention, it is desirable to design each of the positive lens elements and each of the negative lens elements so as to satisfy the condition (5) given below:

$$n_p > 1.7, \quad n_n > 1.7 \tag{5}$$

wherein the reference symbol $n_p$ represents the refractive index of the positive lens element and the reference symbol $n_n$ designates the refractive index of the negative lens element.

If $n_p$ or $n_n$ does not satisfy the condition (5), it will be impossible to correct Petzval's sum of the photographic lens system, thereby allowing aggravation of curvature of field.

DETAILED DESCRIPTION OF THE PREFERRED EMBODIMENTS

Figure 1:
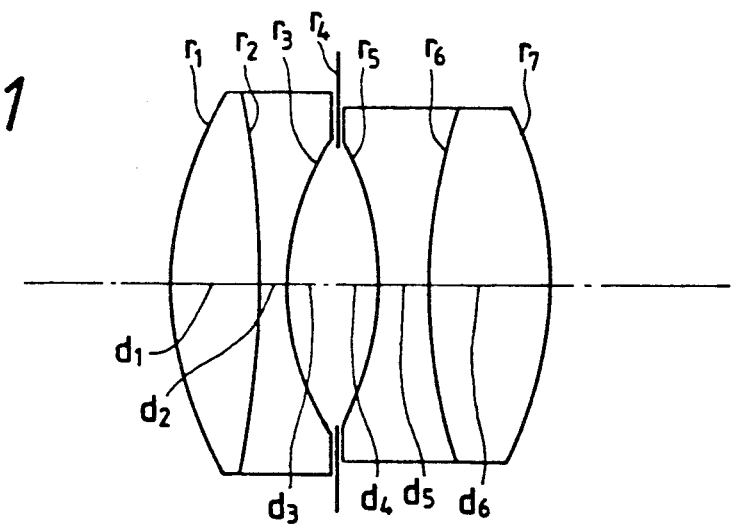
FIG. 1 through FIG. 7 show sectional views illustrating compositions of Embodiments 1 through 7 of the photographic lens system according to the present invention.

Now, the photographic lens system according to the present invention will be described more detailedly below with reference to the preferred embodiments illustrated in the accompanying drawings and given in the form of the following numerical data:

Embodiment 1

$f = 50$ mm, F/1.8, $2\omega = 46.2°$
maximum image height 21.6 mm
$r_1 = 26.8552$ (aspherical surface)
$\quad d_1 = 7.0000 \; n_1 = 1.88300 \; \nu_1 = 40.78$
$r_2 = -69.3109$
$\quad d_2 = 2.0000 \; n_2 = 1.58362 \; \nu_2 = 30.37$
$r_3 = 21.3563$ (aspherical surface)
$\quad d_3 = 4.0000$
$r_4 = \infty$ (stop)
$\quad d_4 = 3.0000$
$r_5 = -23.2622$ -continued $d_5 = 4.0000$ $n_3 = 1.59270$ $\nu_3 = 35.29$
$r_6 = 42.8971$
$d_6 = 9.3270$ $n_4 = 1.78650$ $\nu_4 = 50.00$
$r_7 = -27.7002$ (aspherical surface)
aspherical coefficient
(1st surface)
$P = 1.0000$, $A_4 = 0.19162 \times 10^{-6}$
$A_6 -0.84601 \times 10^{-8}$
(3rd surface)
$P = 1.0000$, $A_4 = 0.10276 \times 10^{-4}$
$A_6 = -0.79362 \times 10^{-8}$
(7th surface)
$P = 1.0000$, $A_4 = 0.72553 \times 10^{-5}$
$A_6 = 0.92896 \times 10^{-8}$
$\Sigma |\Delta x_i| \cdot F/h = 0.0258$, $r_1/r_7 = -0.970$
$r_3 r_5 = -0.918$, $\nu_n = 35.29$, $n_p = 1.7865$

Embodiment 2

$f = 50$ mm, $F/1.8$, $2\omega = 47.0°$
maximum image height 21.6 mm
$r_1 = 38.3177$ (aspherical surface)
$d_1 = 9.5204$ $n_1 = 1.88300$ $\nu_1 = 40.78$
$r_2 = -29.8255$
$d_2 = 1.9981$ $n_2 = 1.59270$ $\nu_2 = 35.29$
$r_3 = 21.8568$ (aspherical surface)
$d_3 = 4.0000$
$r_4 = \infty$ (stop)
$d_4 = 4.0000$
$r_5 = -22.8155$
$d_5 = 1.7712$ $n_3 = 1.59270$ $\nu_3 = 35.29$
$r_6 = 40.9673$
$d_6 = 7.5000$ $n_4 = 1.78650$ $\nu_4 = 50.00$
$r_7 = -23.3033$ (aspherical surface)
aspherical surface coefficient
(1st surface)
$P = 1.0000$, $A_4 = -0.72519 \times 10^{-5}$
$A_6 = -0.23984 \times 10^{-7}$
(3rd surface)
$P = 1.0000$, $A_4 = 0.24665 \times 10^{-5}$
$A_6 = -0.39983 \times 10^{-7}$
(7th surface)
$P = 1.0000$, $A_4 = 0.55388 \times 10^{-5}$
$A_6 = 0.44045 \times 10^{-8}$
$\Sigma |\Delta x_i| \cdot F/h = 0.0546$, $r_1/r_7 = -1.644$
$r_3/r_5 = -0.958$, $\nu_n = 35.29$, $n_p = 1.7865$

Embodiment 3

$f = 50$ mm, $F/2.0$, $2\omega = 46.2°$
maximum image height 21.6 mm
$r_1 = 26.7421$ (aspherical surface)
$d_1 = 7.0000$ $n_1 = 1.88300$ $\nu_1 = 40.78$
$r_2 = -65.1811$
$d_2 = 2.0000$ $n_2 = 1.58362$ $\nu_2 = 30.37$
$r_3 = 20.8817$ (aspherical surface)
$d_3 = 4.0000$
$r_4 = \infty$ (stop)
$d_4 = 3.0000$
$r_5 = -23.8285$
$d_5 = 4.0000$ $n_3 = 1.59270$ $\nu_3 = 35.29$
$r_6 = 44.4388$
$d_6 = 8.9667$ $n_4 = 1.78650$ $\nu_4 = 50.00$
$r_7 = -27.8934$ (aspherical surface)
aspherical surface coefficient
(1st surface)
$P = 1.0000$, $A_4 = -0.84861 \times 10^{-6}$
$A_6 = -0.10812 \times 10^{-7}$
(3rd surface)
$P = 1.0000$, $A_4 = 0.79919 \times 10^{-5}$
$A_6 = -0.14130 \times 10^{-7}$
(7th surface)
$P = 1.0000$, $A_4 = 0.67494 \times 10^{-5}$
$A_6 = 0.99850 \times 10^{-8}$
$\Sigma |\Delta x_i| \cdot F/h = 0.00194$, $r_1/r_7 = -0.959$
$r_3/r_5 = -0.876$, $\nu_n = 35.29$, $n_p = 1.7865$

Embodiment 4

$f = 50$ mm, $F/2.0$, $2\omega = 46.2°$
maximum image height 21.6 mm
$r_1 = 29.1884$ (aspherical surface)
$d_1 = 7.0000$ $n_1 = 1.88300$ $\nu_1 = 40.78$
$r_2 = -47.1833$
$d_2 = 2.0000$ $n_2 = 1.59270$ $\nu_2 = 35.29$
$r_3 = 22.1715$ (aspherical surface)
$d_3 = 4.0000$
$r_4 = \infty$ (stop)
$d_4 = 3.0000$
$r_5 = -24.2856$
$d_5 = 4.0000$ $n_3 = 1.59270$ $\nu_3 = 35.29$
$r_6 = 20.2644$
$d_6 = 17.2218$ $n_4 = 1.78650$ $\nu_4 = 50.00$
$r_7 = -32.7475$ (aspherical surface)
aspherical surface coefficient
(1st surface)
$P = 1.0000$, $A_4 = 0.84878 \times 10^{-6}$
$A_6 = -0.10329 \times 10^{-7}$
(3rd surface)
$P = 1.0000$, $A_4 = 0.13647 \times 10^{-4}$
$A_6 = -0.15650 \times 10^{-8}$
(7th surface)
$P = 1.0000$, $A_4 = 0.68176 \times 10^{-5}$
$A_6 = 0.28081 \times 10^{-7}$
$\Sigma |\Delta x_i| \cdot F/h = 0.0353$, $r_1/r_7 = -0.891$
$r_3/r_5 = -0.913$, $\nu_n = 35.29$, $n_p = 1.7865$

Embodiment 5

$f = 50$ mm, $F/2.0$, $2\omega = 46.2°$
maximum image height 21.6 mm
$r_1 = 36.2942$ (aspherical surface)
$d_1 = 8.0000$ $n_1 = 1.88300$ $\nu_1 = 40.78$
$r_2 = -48.9284$
$d_2 = 5.3353$ $n_2 = 1.58362$ $\nu_2 = 30.37$
$r_3 = 24.9342$
$d_3 = 4.0000$
$r_4 = \infty$ (stop)
$d_4 = 3.0000$
$r_5 = -23.6171$
$d_5 = 4.0000$ $n_3 = 1.59270$ $\nu_3 = 35.29$
$r_6 = 45.2558$
$d_6 = 6.4573$ $n_4 = 1.78650$ $\nu_4 = 50.00$
$r_7 = -24.8479$ (aspherical surface)
aspherical surface coefficient
(1st surface)
$P = 1.0000$, $A_4 = -0.37044 \times 10^{-5}$
$A_6 = -0.76435 \times 10^{-8}$
(7th surface)
$P = 1.0000$, $A_4 = 0.64251 \times 10^{-5}$
$A_6 = 0.12497 \times 10^{-7}$
$\Sigma |\Delta x_i| \cdot F/h = 0.0187$, $r_1/r_7 = -1.461$
$r_3/r_5 = -1.056$, $\nu_n = 35.29$, $n_p = 1.7865$

Embodiment 6

$f = 50$ mm, $F/2.0$, $2\omega = 46.2°$
maximum image height 21.6 mm
$r_1 = 37.3999$
$d_1 = 8.0000$ $n_1 = 1.88300$ $\nu_1 = 40.78$
$r_2 = -93.7555$
$d_2 = 5.3353$ $n_2 = 1.58362$ $\nu_2 = 30.37$
$r_3 = 31.1746$
$d_3 = 4.0000$
$r_4 = \infty$ (stop)
$d_4 = 3.0000$
$r_5 = -22.2200$ (aspherical surface)
$d_5 = 4.0000$ $n_3 = 1.59270$ $\nu_3 = 35.29$
$r_6 = 27.3754$
$d_6 = 10.6573$ $n_4 = 1.78650$ $\nu_4 = 50.00$
$r_7 = -26.4425$ (aspherical surface)
aspherical surface coefficient
(5th surface)
$P = 1.0000$, $A_4 = -0.10931 \times 10^{-4}$
$A_6 \ 0.35816 \times 10^{-7}$ (7th surface)
P = 1.0000, $A_4$ = 0.72775 × 10$^{-5}$
$A_6$ = 0.25271 × 10$^{-7}$
$\Sigma|\Delta x_i| \cdot F/h$ = 0.0164, $r_1/r_7$ = −1.414
$r_3/r_5$ = −1.403, $\nu_n$ = 35.29, $n_p$ = 1.7865

Embodiment 7
f = 50 mm, F/2.8, 2ω = 45.8°
maximum image height 21.6 mm
$r_1$ = 40.9958
$d_1$ = 8.0000 $n_1$ = 1.88300 $\nu_1$ = 40.78
$r_2$ = −76.4435
$d_2$ = 5.3353 $n_2$ = 1.58362 $\nu_2$ = 30.37
$r_3$ = 38.9072
$d_3$ = 4.0000
$r_4$ = ∞ (stop)
$d_4$ = 3.0000
$r_5$ = −19.8613
$d_5$ = 4.0000 $n_3$ = 1.59270 $\nu_3$ = 35.29
$r_6$ = 34.9629
$d_6$ = 9.5155 $n_4$ = 1.78650 $\nu_4$ = 50.00
$r_7$ = −24.6897 (aspherical surface)
aspherical surface coefficient
P = 1.0000, $A_4$ = 0.10173 × 10$^{-4}$
$A_6$ = 0.21242 × 10$^{-7}$
$\Sigma|\Delta x_i| \cdot F/h$ = 0.00412, $r_1 r_7$ = −1.660
$r_3/r_5$ = −1.959, $\nu_n$ = 35.29, $n_p$ = 1.7865 wherein the reference symbols $r_1$, $r_2$, ... represent the radii of curvature on the surfaces of the respective lens elements, the reference symbols $d_1$, $d_2$, ... designate the thicknesses of the respective lens elements and the airspaces reserved therebetween, the reference symbols $n_1$, $n_2$, ... denote the refractive indices of the respective lens elements, and the reference symbols $\nu_1$, $\nu_2$, ... represent Abbe's numbers of the respective lens elements.

The Embodiment 1 has the composition illustrated in FIG. 1, wherein the photographic lens system according to the present invention comprises four positive, negative, negative and positive lens elements arranged in the order from the object side, the first lens element being cemented to the second lens element and the third lens element being cemented to the fourth lens element. Further, the first surface, the third surface and the seventh surface are designed as aspherical surfaces each satisfying the condition (4). Though the photographic lens system preferred as the Embodiment 1 is composed only of the four lens elements, the lens system has an aperture ratio of F/1.8 and aberrations which are corrected as favorably as those in the conventional Gauss type lens system consisting of six lens elements.

Figure 2:
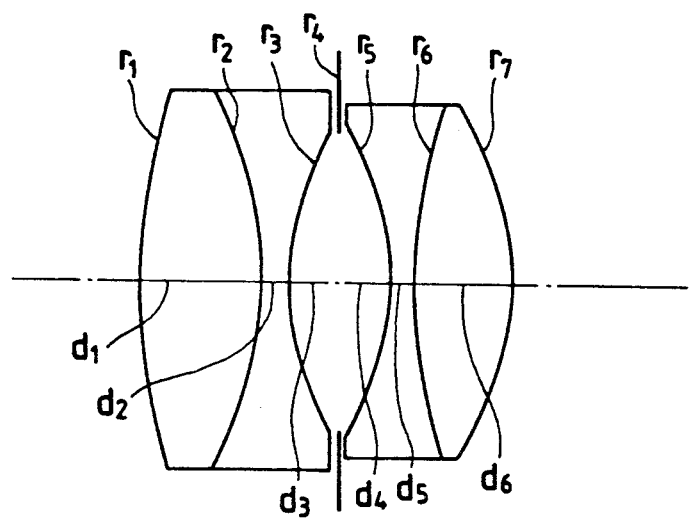

The Embodiment 2 has the composition illustrated in FIG. 2, wherein the photographic lens system according to the present invention comprises four positive, negative, negative and positive lens elements arranged in the order from the object side, the first lens element being cemented to the second lens element and the third lens element being cemented to the fourth lens elements. Similarly to the aspherical surface design in the Embodiment 1, the first surface, the third surface and the seventh surface are designed as aspherical surfaces each satisfying the condition (4), thereby correcting aberrations favorably in the Embodiment 2. The Embodiment 2 also has an aperture ratio of F/1.8.

Figure 3:
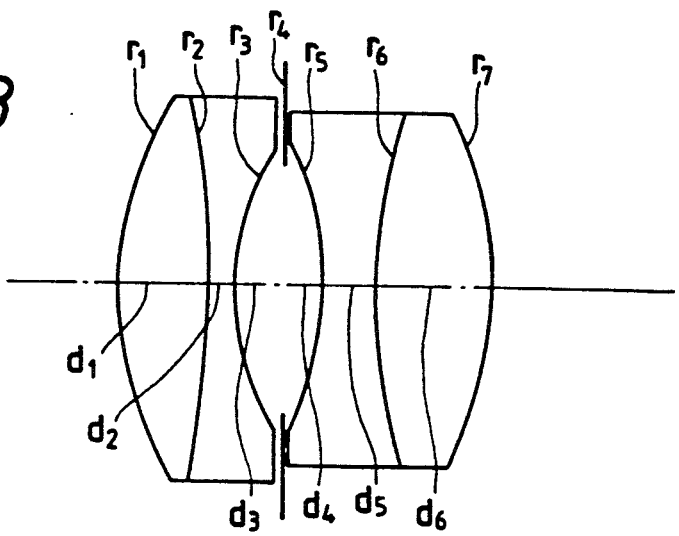

The Embodiment 3 has the composition illustrated in FIG. 3, wherein the photographic lens system according to the present invention comprises four positive, negative, negative and positive lens elements, the first lens element being cemented to the second lens element and the third lens element being cemented to the fourth lens element. Like the Embodiment 1, the Embodiment 3 uses aspherical surfaces satisfying the condition (4) as the first surface, the third surface and the seventh surface for correcting aberrations favorably therein. Since the Embodiment 3 has an aperture ratio of F/2.0 for facilitating correction of aberrations, it has aberrations corrected more favorably than those in the Embodiments 1 and 2.

Figure 4:
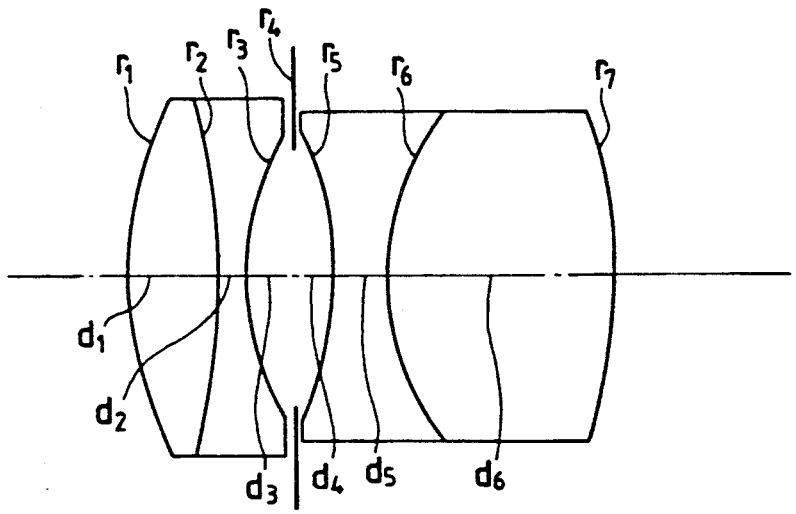

The Embodiment 4 has the composition illustrated in FIG. 4, wherein the photographic lens system according to the present invention comprises four positive, negative, negative and positive lens elements arranged in the order from the object side, the first lens element being cemented to the second lens element and the third lens element being cemented to the fourth lens elements, and uses aspherical surfaces satisfying the condition (4) as the first surface, the third surface and the seventh surface for correcting aberrations favorably therein. The Embodiment 4 also has an aperture ratio of F/2.0.

Figure 5:
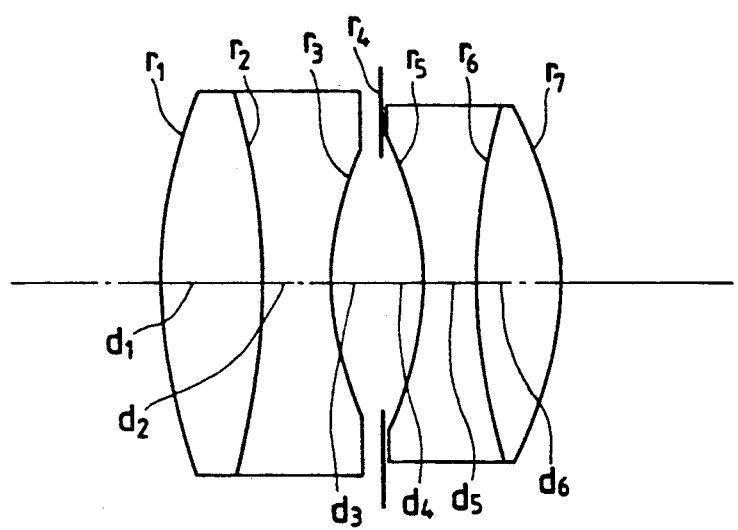

The Embodiment 5 has the composition shown in FIG. 5, wherein the photographic lens system according to the present invention comprises four positive, negative, negative and positive lens elements arranged in the order from the object side, the first lens element being cemented to the second lens element and the third lens element being cemented to the fourth lens element. The first surface and the seven surface adopted in the Embodiment 5 are designed as aspherical surfaces satisfying the condition (4). The Embodiment 5 uses the two aspherical surfaces and is more desirable from the viewpoint of manufacturing cost though it allows slightly more aberrations than the Embodiments each of which uses the three aspherical surfaces. The Embodiment 5 is designed for an aperture ratio of F/2.0.

Figure 6:
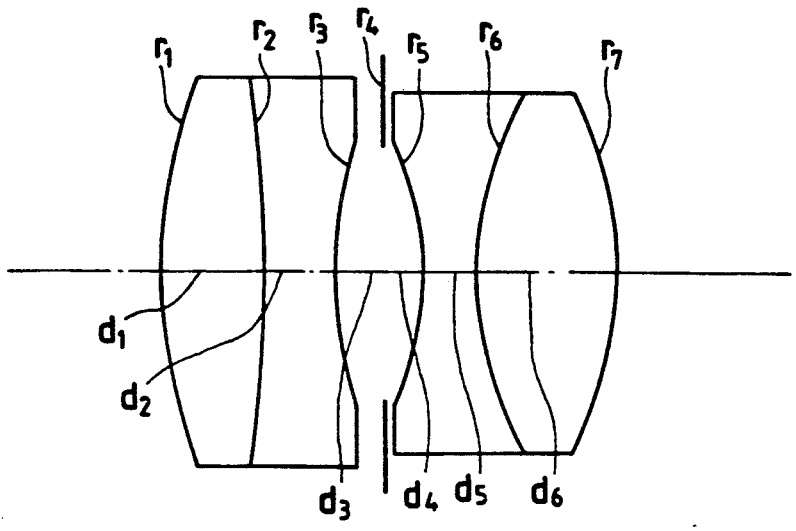

The Embodiment 6 has the composition shown in FIG. 6, wherein the photographic lens system according to the present invention comprises four positive, negative, negative and positive lens elements arranged in the order from the object side, the first lens element being cemented to the second lens element and the third lens element being cemented to the fourth lens element. The fifth surface and the seventh surface are designed as aspherical surface satisfying the condition (4). The Embodiment 6 uses the two aspherical surfaces like the Embodiment 5, but at locations different from those selected in the Embodiment 5. The aspherical surfaces can be used effectively for correcting aberrations regardless of their locations as exemplified by the Embodiment 6. The Embodiment 5 is also designed for an aperture ratio of F/2.0.

Figure 7:
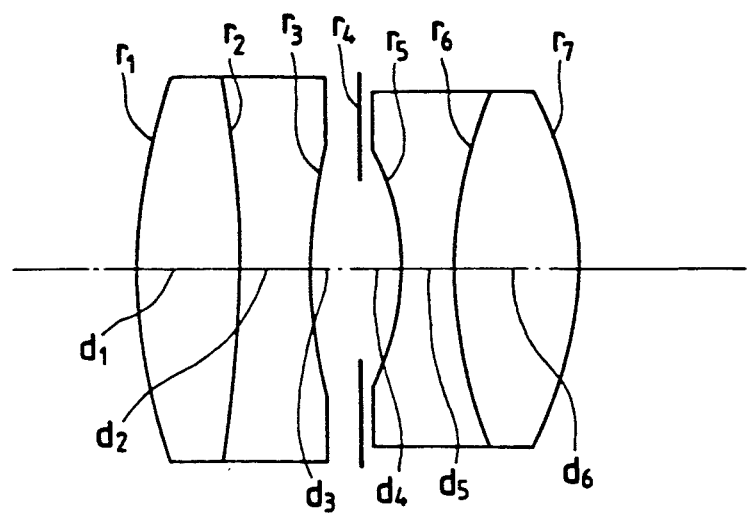
Figure 8:
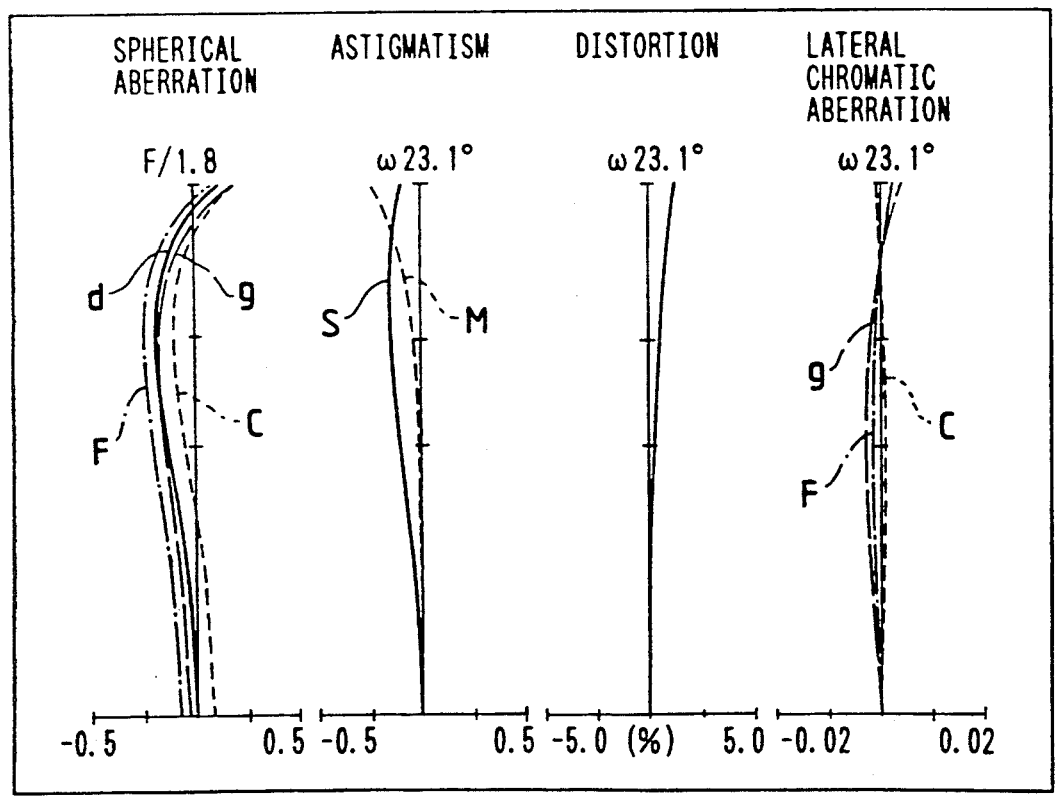
FIG. 8 through FIG. 14 show curves illustrating aberration characteristics of the Embodiments 1 through 7 respectively of the present invention.
Figure 9:
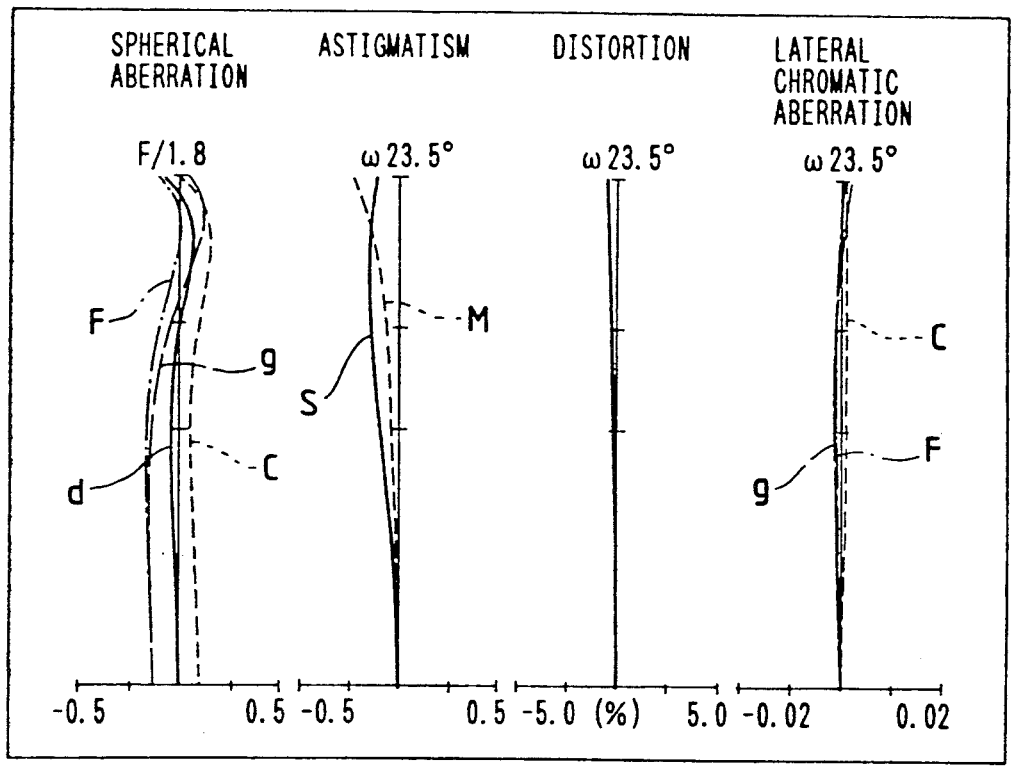
Figure 10:
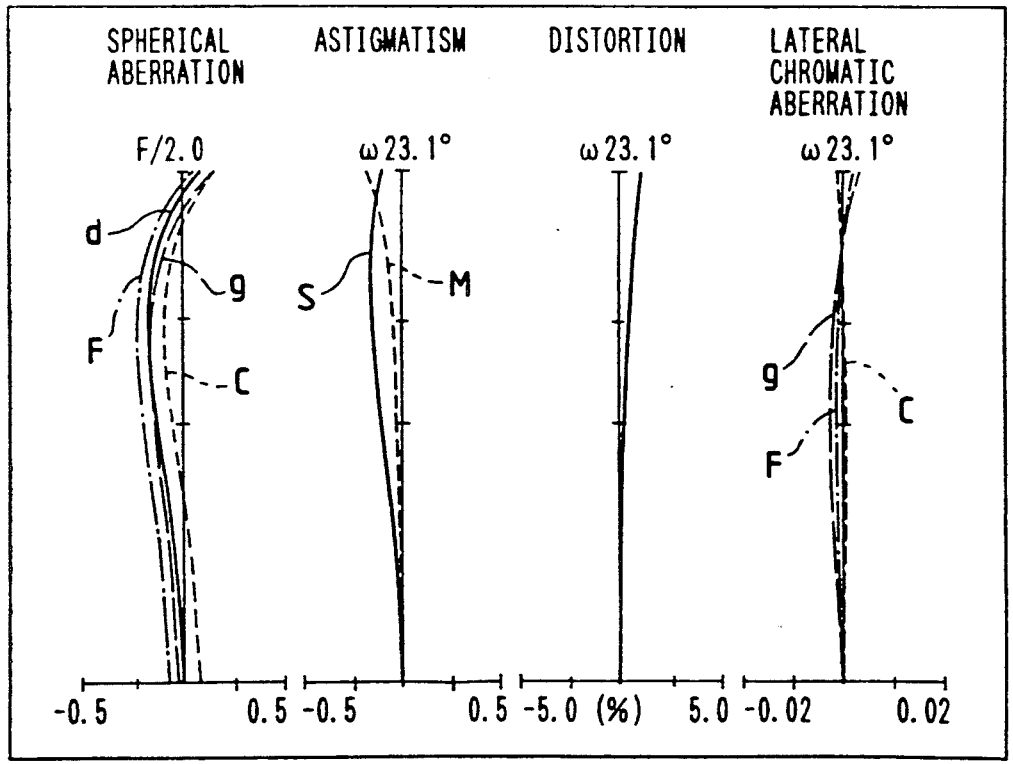
Figure 11:
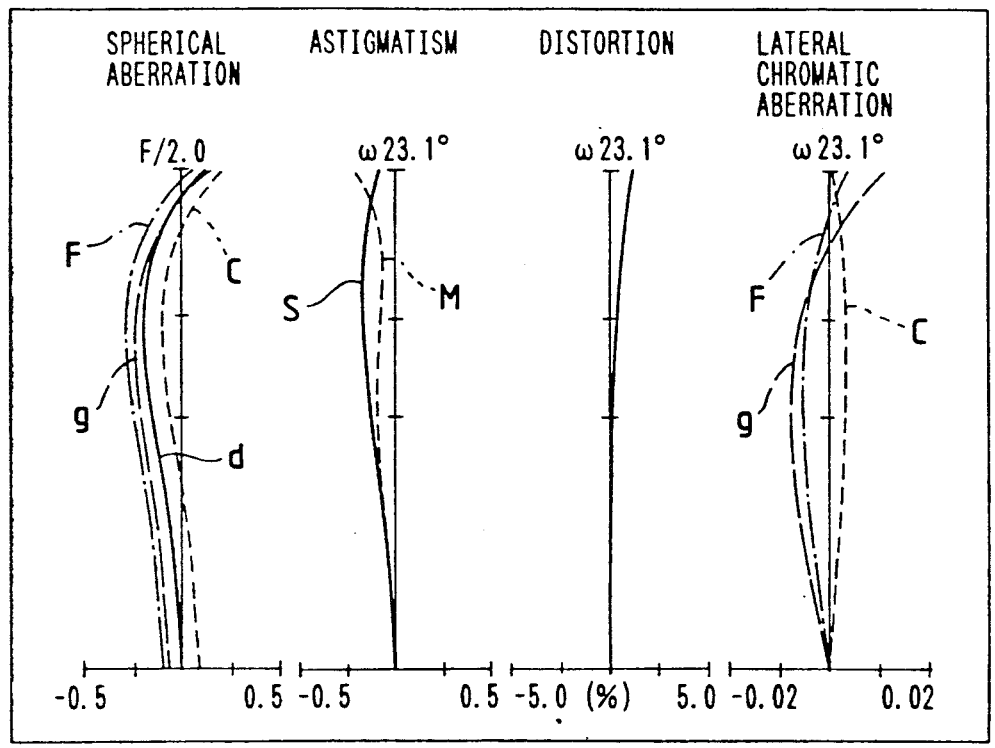
Figure 12:
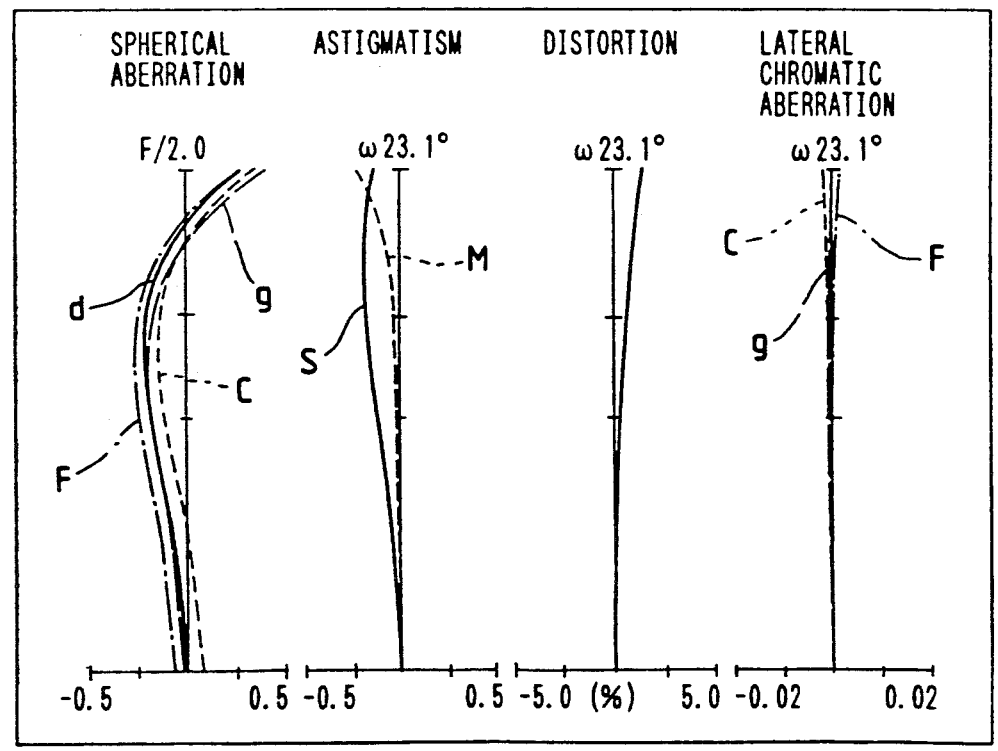
Figure 13:
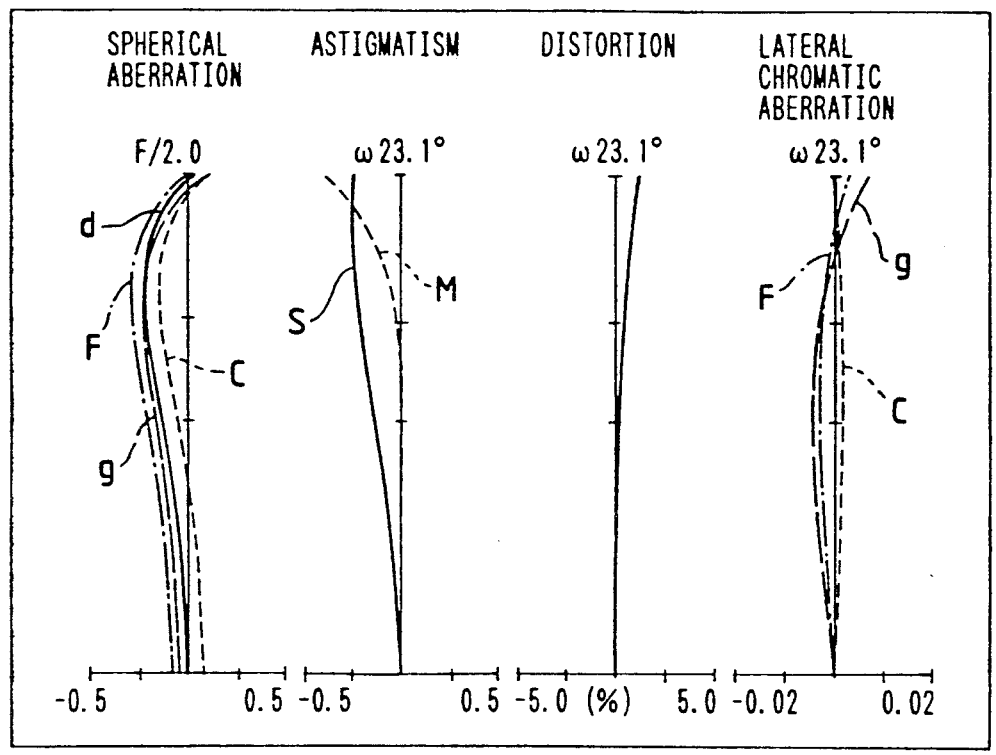
Figure 14:
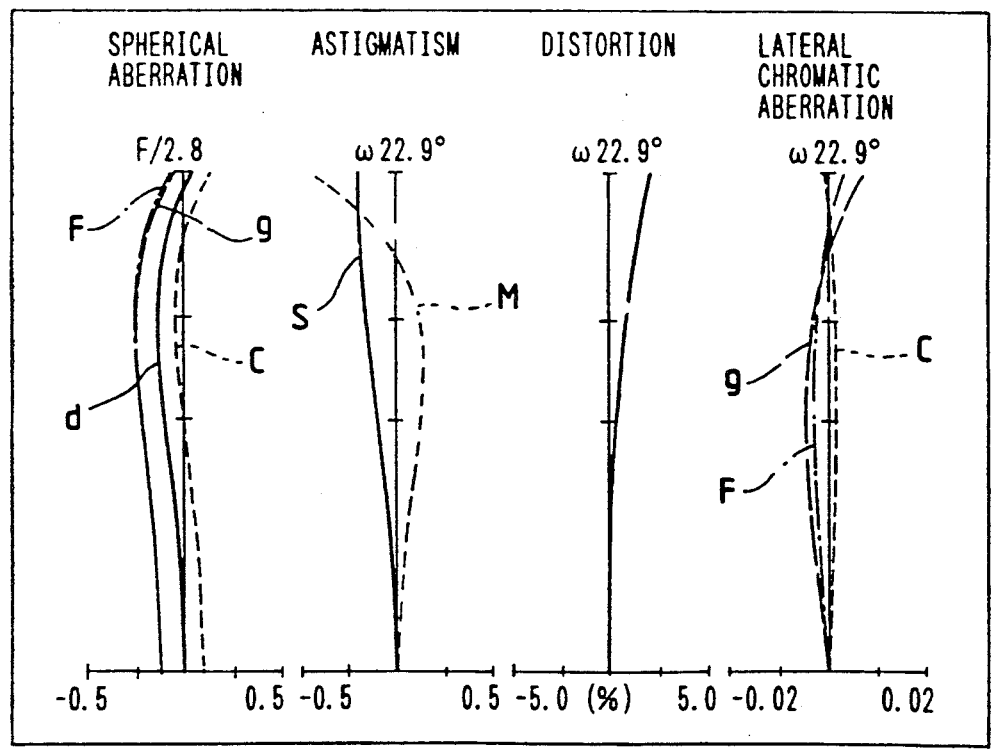

The Embodiment 7 has the composition visualized in FIG. 7, wherein the photographic lens system according to the present invention comprises four positive, negative, negative and positive lens elements arranged in the order from the object side, the first lens element being cemented to the second lens element and the third lens element being cemented to the fourth lens element. The seventh surface is designed as an aspherical surface satisfying the condition (4). The Embodiment 7 has an aperture ratio of F/2.8 and has favorably corrected aberrations though it uses only one aspherical surface.

As is understood from the foregoing description, the photographic lens system according to the present invention comprises lens elements in a number as small as four, and has a high aperture ratio and favorably corrected aberrations, and is usable as a standard lens system for photographic cameras.

I claim:

1. A photographic lens system comprising, in the order from the object side:
    a first doublet consisting of a positive lens element and a negative lens element,
    a second doublet consisting of a negative lens element and a positive lens element, and
    an aperture stop disposed between said first doublet and said second doublet,
    wherein the most image side surface of said second doublet is an aspherical surface.

2. A photographic lens system according to claim 1, wherein the most object side surface of said first doublet is an aspherical surface.

3. A photographic lens system according to claim 2, wherein the most image side surface of said first doublet is an aspherical surface.

4. A photographic lens system according to claim 1, wherein the most object side of said second doublet is an aspherical surface.

5. A photographic lens system comprising, in the order from the object side:
    a first doublet consisting of a positive lens element and a negative lens element,
    a second doublet consisting of a negative lens element and a positive lens element, and
    an aperture stop disposed between said first doublet and said second doublet,
    said photographic lens system comprising at least one aspherical surface, which is expressed, when the intersection between the aspherical surface and the optical axis is taken as the origin, the direction of the optical axis is taken as the x axis and the direction perpendicular to the optical axis is taken as the y axis, by the formula below and satisfying the following condition (1):

$$x = \frac{y^2/r}{1 + \sqrt{1 - p(y/r)^2}} + \sum_{i=2}^{n} A_{2i} y^{2i}$$

-continued $$(1) \quad 0.003 < \Sigma |\Delta x_i| \cdot F/h < 0.1 \quad (y = y_{mi})$$

wherein the reference symbol r represents the radius of curvature on the reference sphere of said aspherical surface, the reference symbol p designates the conical constant, the reference symbol $A_{2i}$ denotes the aspherical surface coefficient, the reference symbol $\Delta x_1$ represents the departure of the aspherical surface used as the i'th surface from the reference sphere thereof, the reference symbol $y_{mi}$ designates the height of the marginal ray on the i'th surface and the reference symbol h denotes the maximum image height.

6. A photographic lens system according to claim 5 satisfying the following condition (2):

$$r_1 > r_3, r_7 > r_5 \quad (2)$$

wherein the reference symbols $r_1$ and $r_3$ represent the radii of curvature on the object side surface and the image side surface respectively of the first doublet, and the reference symbols $r_5$ and $r_7$ designate the radii of curvature on the object side surface and the image side surface respectively of the second doublet.

7. A photographic lens system according to claim 6 satisfying the following condition (3):

$$-2.5 < r_1/r_7 < -0.4, \quad -2.5 < r_3/r_5 < -0.4 \quad (3)$$

8. A photographic lens system according to claim 7 satisfying the following condition (4):

$$\nu_n < 50 \quad (4)$$

wherein the reference symbol $\nu_n$ represents the Abbe's number of each of the negative lens elements.

9. A photographic lens system according to claim 8 satisfying the following condition (5):

$$n_p > 1.7, \quad n_n < 1.7 \quad (5)$$

wherein the reference symbol $n_p$ represents the refractive index of each of the positive lens elements and the reference symbol $n_n$ designates the refractive index of each of the negative lens elements.

* * * * *